United States Patent
Iida et al.

(10) Patent No.: US 11,792,332 B2
(45) Date of Patent: Oct. 17, 2023

(54) EVALUATING PRINT PRODUCT IN CONSIDERATION OF CHARACTERISTICS OF PRINTING APPARATUS

(71) Applicant: CANON KABUSHIKI KAISHA, Tokyo (JP)

(72) Inventors: Toshihiko Iida, Ibaraki (JP); Yoshiji Kanamoto, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 153 days.

(21) Appl. No.: 17/412,517

(22) Filed: Aug. 26, 2021

(65) Prior Publication Data

US 2022/0086286 A1    Mar. 17, 2022

(30) Foreign Application Priority Data

Sep. 16, 2020   (JP) ................................ 2020-155755

(51) Int. Cl.
*H04N 1/00* (2006.01)
*G06F 3/12* (2006.01)

(52) U.S. Cl.
CPC ....... *H04N 1/00074* (2013.01); *G06F 3/1208* (2013.01); *G06F 3/1243* (2013.01); *G06F 3/1259* (2013.01); *H04N 1/00039* (2013.01); *H04N 1/00137* (2013.01)

(58) Field of Classification Search
None
See application file for complete search history.

(56) References Cited

U.S. PATENT DOCUMENTS

| | | | | |
|---|---|---|---|---|
| 2012/0177291 A1* | 7/2012 | Gronau | ................ | G06V 10/98 |
| | | | | 382/218 |
| 2014/0002842 A1* | 1/2014 | Ito | ..................... | B41F 33/0036 |
| | | | | 358/1.13 |

FOREIGN PATENT DOCUMENTS

JP    2012064831 A    3/2012

* cited by examiner

*Primary Examiner* — Eric A. Rust
(74) *Attorney, Agent, or Firm* — ROSSI, KIMMS & McDOWELL LLP

(57) ABSTRACT

A production control apparatus is provided. The production control apparatus receives a print product production instruction, determines, in accordance with the production instruction, a production apparatus to be used for print product production, determines a first inspection item according to quality requirement data received together with the production instruction and a second inspection item according to the production apparatus respectively, and regarding the print product produced by using the production apparatus, inspects the determined first inspection item and the second inspection item respectively, and obtains an inspection result.

11 Claims, 18 Drawing Sheets

| APPARATUS NAME | TYPE OF APPARATUS | MANDATORY APPARATUS INSPECTION |
|---|---|---|
| iPW C8100 | ON-DEMAND PRINTING MACHINE | FRONT AND BACK DEVIATION, DENSITY VARIATION |
| RWOTH GX12 | OFFSET PRINTING MACHINE | HICKEY, GHOST |
| CRAED 5000 | INK-JET PRINTING MACHINE | PRINT LACK, BEADING |
| FCE-B1 | GRAVURE PRINTING MACHINE | PINHOLE, DOCTOR STREAK |
| PreaeXT | PERFECT BINDING BOOKBINDING APPARATUS | ADDITIONAL/MISSING PAGE |
| CS2+ | TRIMMING DIMENSION INSPECTION APPARATUS | DIMENSION |
| CN4 | BUSINESS CARD TRIMMING MACHINE | — |
| AF-612N | FOLDING MACHINE | — |

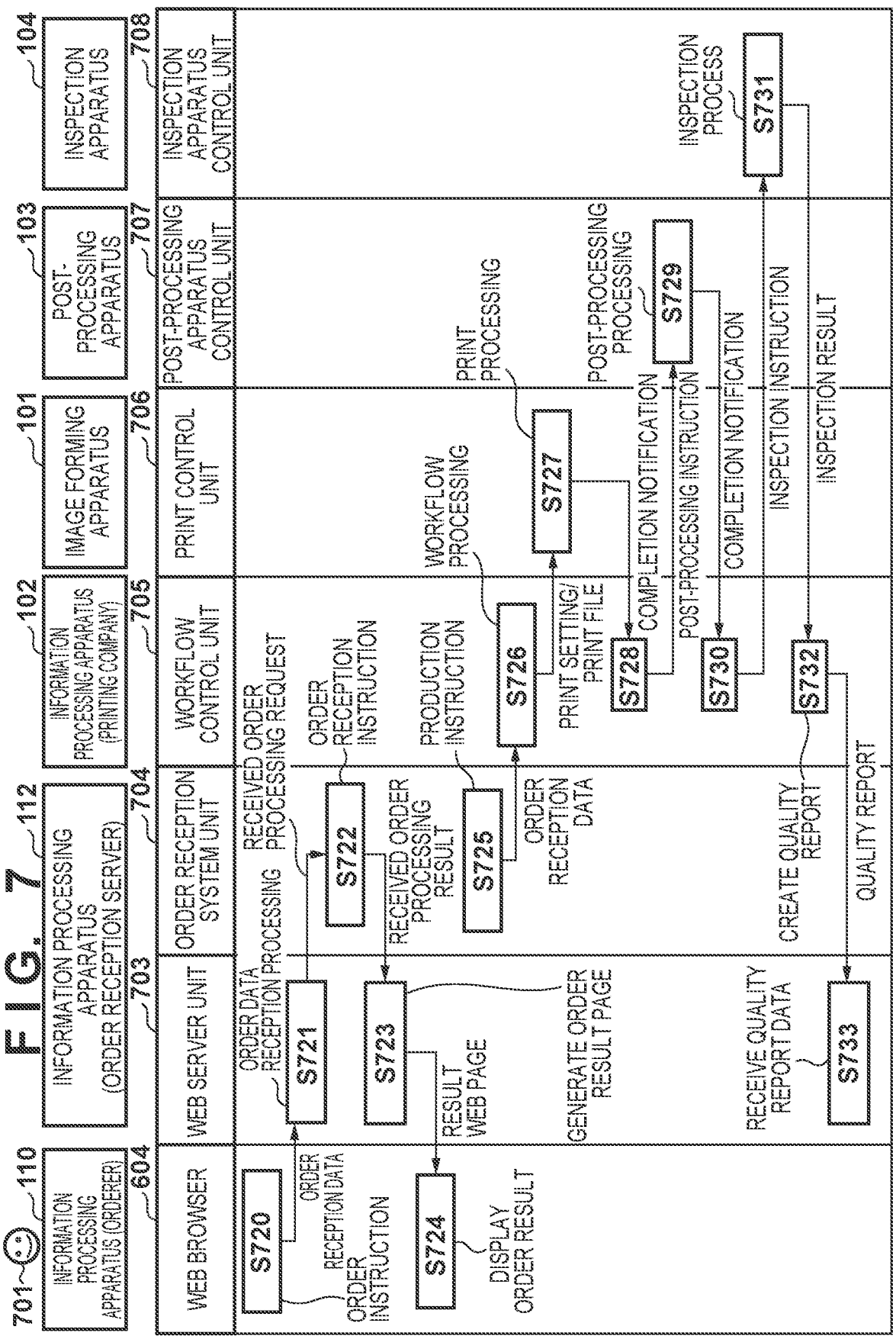

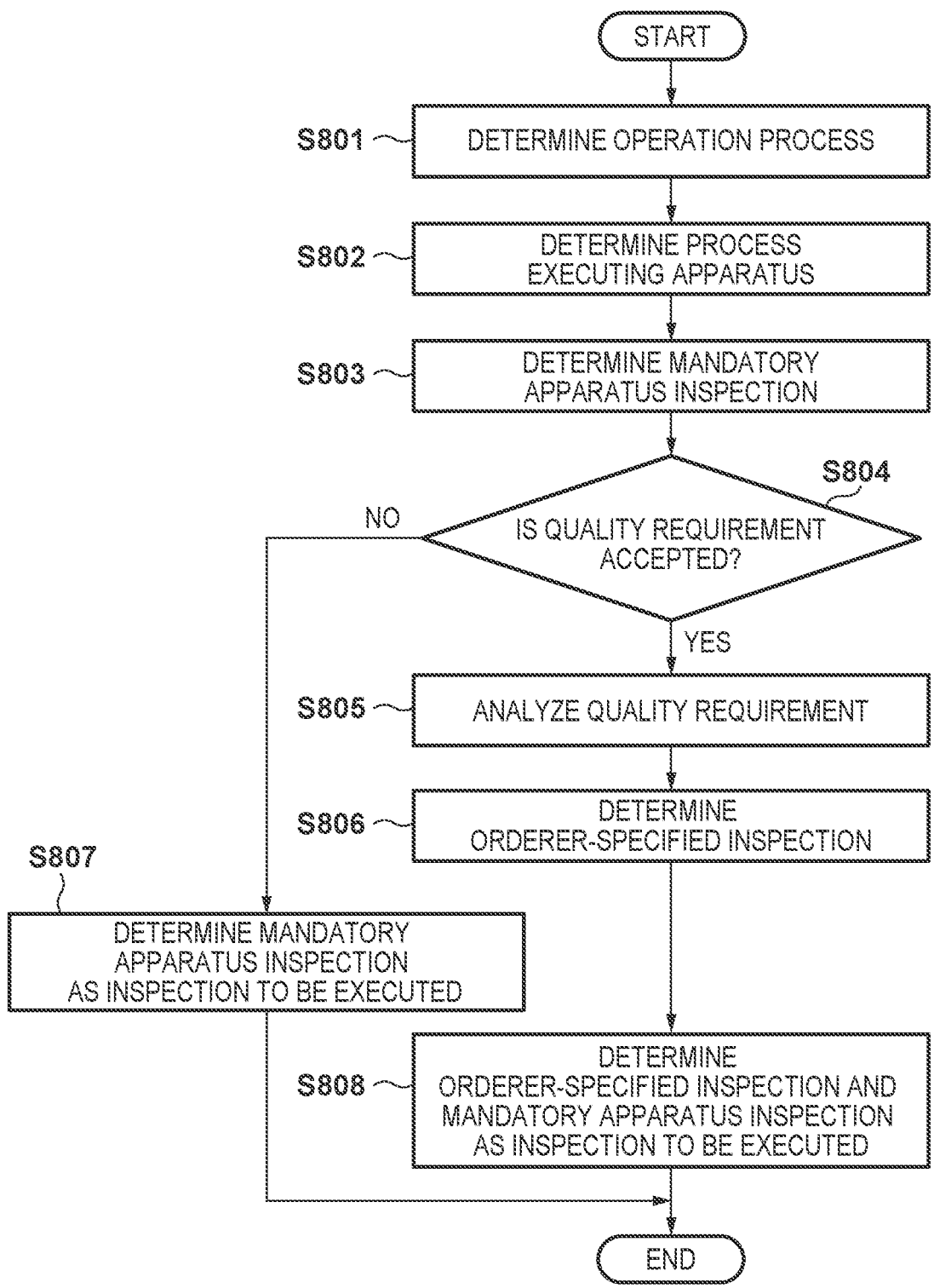

FIG. 9A

| TYPE OF PRODUCT | OPERATION PROCESS |
|---|---|
| PHOTO BOOK | PRINTING, TRIMMING, BINDING, TRIMMING, PACKING, SHIPPING |
| BUSINESS CARD | PRINTING, TRIMMING, PACKING, SHIPPING |
| FLYER | PRINTING, PACKING, SHIPPING |
| FOLDED FLYER | PRINTING, FOLDING, PACKING, SHIPPING |
| FILM PACKAGE | PRINTING, BAG MAKING, PACKING, SHIPPING |

FIG. 9B

| PROCESS 910 | TYPE OF PRODUCT 911 | 912 | NUMBER OF COPIES 913 | TYPE OF APPARATUS 914 | APPARATUS NAME 915 |
|---|---|---|---|---|---|
| PRINTING | FLYER | | LESS THAN 200 COPIES | ON-DEMAND PRINTING MACHINE | iPW C8100 |
| | | | GREATER THAN OR EQUAL TO 200 COPIES | OFFSET PRINTING MACHINE | RWOTH GX12 |
| | PHOTO BOOK | | — | INK-JET PRINTING MACHINE | CRAED 5000 |
| | BUSINESS CARD | | LESS THAN 500 COPIES | ON-DEMAND PRINTING MACHINE | iPW C8100 |
| | | | GREATER THAN OR EQUAL TO 500 COPIES | OFFSET PRINTING MACHINE | RWOTH GX12 |
| | FILM PACKAGE | | — | GRAVURE PRINTING MACHINE | FCE-B1 |
| BAG MAKING | — | | — | BAG MAKING AND PACKING MACHINE | GU-1100 |
| BINDING | — | | — | WIRELESS BINDING | Mgwe350 |
| TRIMMING | PHOTO BOOK | | — | THREE-SIDE TRIMMING MACHINE | CS2+ |
| | BUSINESS CARD | | — | BUSINESS CARD TRIMMING MACHINE | CN4 |
| FOLDING | — | | — | FOLDING MACHINE | AF-612N |

FIG. 9C

| APPARATUS NAME 920 | TYPE OF APPARATUS 921 | MANDATORY APPARATUS INSPECTION 923 |
|---|---|---|
| iPW C8100 | ON-DEMAND PRINTING MACHINE | FRONT AND BACK DEVIATION, DENSITY VARIATION |
| RWOTH GX12 | OFFSET PRINTING MACHINE | HICKEY, GHOST |
| CRAED 5000 | INK-JET PRINTING MACHINE | PRINT LACK, BEADING |
| FCE-B1 | GRAVURE PRINTING MACHINE | PINHOLE, DOCTOR STREAK |
| PreaeXT | PERFECT BINDING BOOKBINDING APPARATUS | ADDITIONAL/MISSING PAGE |
| CS2+ | TRIMMING DIMENSION INSPECTION APPARATUS | DIMENSION |
| CN4 | BUSINESS CARD TRIMMING MACHINE | — |
| AF-612N | FOLDING MACHINE | — |

(922 labels the TYPE OF APPARATUS column)

FIG. 9D

| INSPECTION 930 | TYPE OF INSPECTION APPARATUS 932 | INSPECTION APPARATUS NAME 933 | EVALUATION CRITERIA 934 |
|---|---|---|---|
| FRONT AND BACK DEVIATION | IMAGE POSITION DEVIATION INSPECTION MACHINE | KI-SQ | 10: < 0.5mm, 8: < 1.0mm |
| PINHOLE | PINHOLE INSPECTION MACHINE | C124683 | 10: < 0.2mm, 9: < 0.4mm |
| CONTAMINATION OF FOREIGN MATTER | BAG PRODUCT INSPECTION APPARATUS | DBA-JU23 | 10: None |
| ADDITIONAL/ MISSING PAGE | THICKNESS INSPECTION APPARATUS | YZF-R3 | 10: None |
| DENSITY VARIATION | DENSITY INSPECTION APPARATUS | KSII-210U | 10: < 0.1D, 8: < 0.15D |
| DOCTOR STREAK | IMAGE INSPECTION APPARATUS | RSK-N78 | 10: < 1.0mm, 8: < 2.0mm |
| HICKEY | DEFECT INSPECTION APPARATUS | UESF-R10 | 10: < 1.0mm, 2:8: < 2.0mm2 |
| GHOST | DENSITY INSPECTION APPARATUS | BRF-40K | 10: < 0.1D, 8: < 0.15D |

931

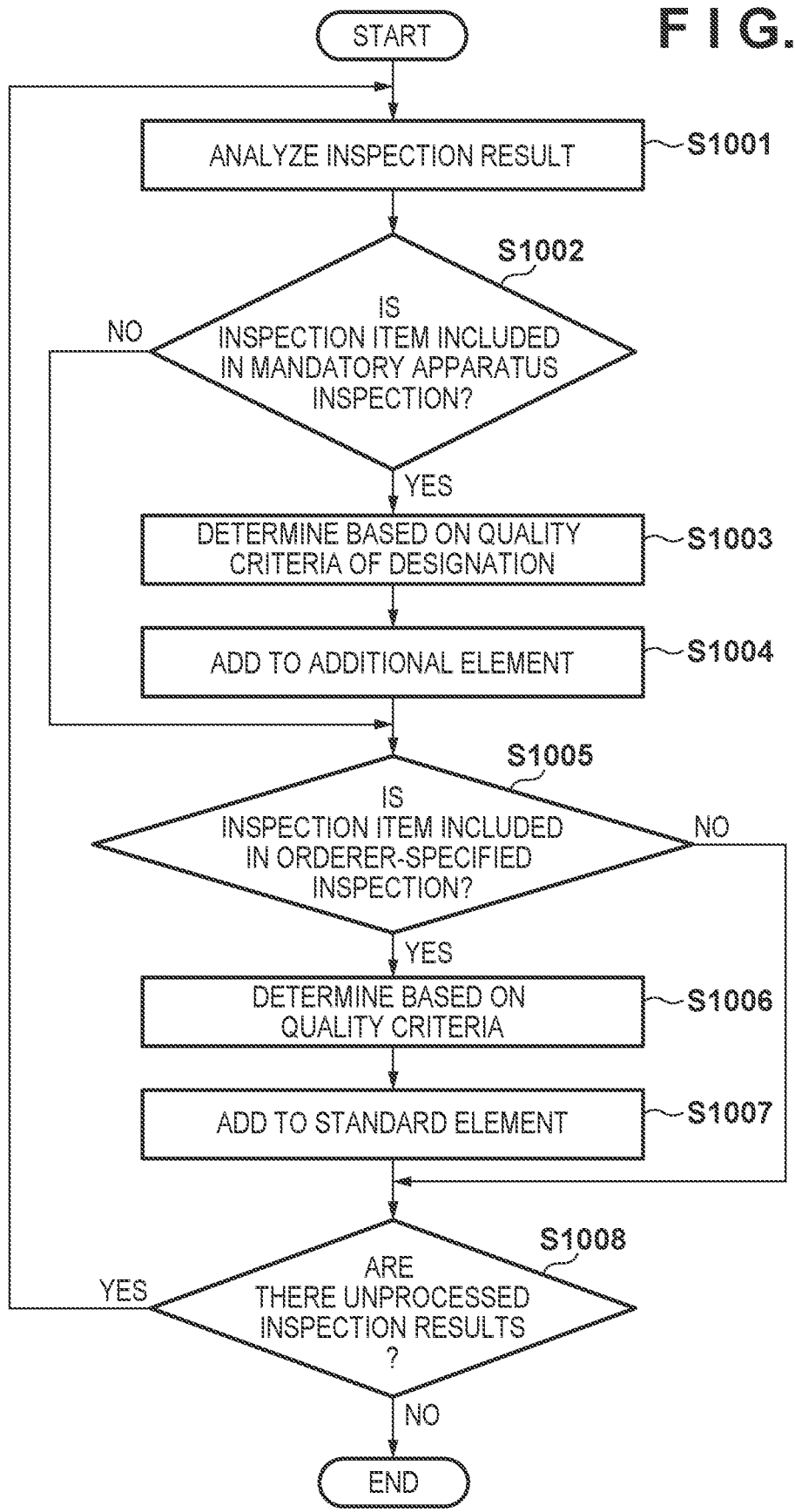

FIG. 11A http://xxx.yyy.zzz.com — 1101
AAA Printing Company — 1102
— 1100

Please select a product.

| Business Cards | Flyers | Photo Books | Film Packaging |

1103   1104   1105   1106

AAA Printing Company

FIG. 11B http://xxx.yyy.zzz.com/order.php?product — 1101
Order Confirmation-AAAp — 1102
— 1110

Flyers

| Size* | 8.8"×11" ▼ | — 1111 |
| PaperThickness* | Standard ▼ | — 1112 |
| Paper Stock* | Matte ▼ | — 1113 |
| Quantity* | 250 ▼ | — 1114 |
| Add accessories | Half-Fold ▼ | — 1115 |

AAA Printing Company

FIG. 11C http://xxx.yyy.zzz.com/order.php?product — 1101
Upload files--AAA Printing — 1102
— 1120

Upload a Print Ready File

| PDF* | C:\data\product1.pdf | Select | — 1121 |
| PRX | C:\data\product1.prx | Select | — 1122 |

Upload — 1123    Back — 1124

AAA Printing Company

F I G. 12A

```xml
<?xml version="1.0" encoding="UTF-8"?>
<PRX xmlns:prx="http://xxx.org/prx" xmlns:cc="http://yyy.com/CxF" xmlns="http://zzz.org/prx"
xmlns:xsi="http://www.w3.org/1801/XMLSchema-instance"
xsi:schemaLocation="http://xxx.yyy.zzz.org/prx PRX.xsd">
    <PRXInfo>
        <PRXDate>2019-03-27</PRXDate><PRXId>prx01673</PRXId><PRXVersion>1.01</PRXVersion>
    </PRXInfo>
    <QualityGoals>
        <Color>
            <ColorScore>
                <ColorScoringScale>
                    <UoM>dE</UoM>
                    <ParameterScore DisplayLabel="Excellent" Rank="10">
                        <ValueRange>
                            <LogicalOperator>LT</LogicalOperator><CalculatedValue>0.4</CalculatedValue>
                        </ValueRange>
                    </ParameterScore>
                    :
                </ColorScoringScale>
            </ColorScore>
            <ColorParameter>
                <SamplingPosition>
                    <SamplingPositionMatrix>
                        <UoM>pt</UoM>
                        <PositionDefinition PositionLabel="positionCol1">
                            <XPosition>334.0</XPosition><YPosition>423.0</YPosition>
                        </PositionDefinition>
                    </SamplingPositionMatrix>
                </SamplingPosition>
                <CxFReferenceObjectIdLink>CxF001</CxFReferenceObjectIdLink>
            </ColorParameter>
        </Color>
```

```
<?xml version="1.0" encoding="UTF-8"?>
<PQX xmlns:pqx="http://xxx.org/pqx" xmlns:cc="http://yyy.com/CxF" xmlns="http://zzz.org/pqx"
    xmlns:xsi="http://www.w3.org/1801/XMLSchema-instance"
    xsi:schemaLocation="http://xxx.yyy.zzz.org/PQX.xsd">
    <PQXInfo><PQXDate>2019-03-27</PQXDate><PQXId>xxx</PQXId></PQXInfo>
    <PrinterInfo><CompanyName>AAA Printing Company</CompanyName><Location>xxxxx</Location></PrinterInfo>
    <PressRunInfo>
        <DatePrinted>2019-03-27</DatePrinted><PrinterLotId>Lot No.3</PrinterLotId>
        <RunLength TotalRolls="10" TotalMeterage="200000" UoM="m"/>
        <PrintMethod>ElectroPhotography</PrintMethod><PressOperator>Mr. Right</PressOperator>
    </PressRunInfo>
    <ReporterCollection>...</ReporterCollection>
    <CustomerCollection><Customer>ABC Ltd.</Customer></CustomerCollection>
```

F I G. 13B

```
<TagCollection Name="QualityResult">
    <TagCollection Name="Color">
        <TagCollection Name="ColorScore">
            <TagCollection Name="ParameterScore">
                <Tag Name="DisplayLabel" Value="Excellent"/><Tag Name="Rank" Value="10"/>
            </TagCollection>
        </TagCollection>
    <TagCollection Name="Defects">
        <TagCollection Name="DefectsScore">
            <TagCollection Name="DefectTypeDefinition">
                <Tag Name="DefectTypeDefectName" Value="hicky"/>
            </TagCollection>
            <TagCollection Name="ParameterScore">
                <Tag Name="DisplayLabel" Value="Excellent"/><Tag Name="Rank" Value="10"/>
            </TagCollection>
            <TagCollection Name="ParameterScore">
                <Tag Name="DisplayLabel" Value="Excellent"/><Tag Name="Rank" Value="8"/>
                <Tag Name="Appended" Value="true"/>
            </TagCollection>
        </TagCollection>
        <TagCollection Name="DefectsScore">
            <Tag Name="Appended" Value="true"/>
            <TagCollection Name="DefectTypeDefinition">
                <Tag Name="DefectTypeDefectName" Value="ghost"/>
            </TagCollection>
            <TagCollection Name="ParameterScore">
                <Tag Name="DisplayLabel" Value="Excellent"/><Tag Name="Rank" Value="8"/>
            </TagCollection>
        </TagCollection>
    </TagCollection>
</TagCollection>
```

F I G. 13C

```
                                                                        1217   1218
<SampleCollection>
  <Sample>
    <SampleDescription>
      <RunPosition Roll="5" Meterage="34351" UoM="m"/>
    </SampleDescription>
    <ColorReport>
      <Measurement Id="001">
        <CxFSampleObjectIdLink>CXF001</CxFSampleObjectIdLink>
      </Measurement>
    </ColorReport>
  </Sample>

<Sample>
    <TagCollection Name="AppendedSample"><Tag Name="Appended" Value="true"/></TagCollection>
    <SampleDescription>
      <RunPosition Roll="5" Meterage="64533" UoM="m"/>
    </SampleDescription>
    <DefectReport>
      <DefectSet>
        <DefectData>
          <DefectName>hickey</DefectName>
          <DefectSize><UoM>mm2</UoM><DefectArea>1.4</DefectArea></DefectSize>
        </DefectData>
      </DefectSet>
    </DefectReport>
  </Sample>

</SampleCollection>
<CxFSampleData>
                                                                               1219
  :
</CxFSampleData>
</PQX>
```

EVALUATING PRINT PRODUCT IN CONSIDERATION OF CHARACTERISTICS OF PRINTING APPARATUS

BACKGROUND OF THE INVENTION

Field of the Invention

The present invention relates to a production control apparatus, a production method, and a medium.

Description of the Related Art

In the field of commercial printing, it desired to electronically exchange information regarding quality requirements and reports of products that the orderer requests from the printing company. Examples of specifications for realizing this include standards such as PQX/PRX (Print Quality eXchange/Print Request eXchange) and JDF (Job Definition Format). In this manner, a series of processes are digitized by transmitting by the PRX a quality request of the products requested by the orderer to the printing company, and by reporting by the PQX the quality of the products produced by the printing company to the orderer. As a result, an orderer who has knowledge of a print product and print data can specify in detail the quality items that depend on print data such as color tone.

There are printing apparatuses of various printing methods, where are selectively used depending on conditions such as a type of a print product to be generated, a medium to be printed on, and the number of copies to be generated. It is known that defects that occur in a generated print product differ depending on the printing method of a printing apparatus. For example, an on-demand printing machine used to print a relatively small number of copies may experience print position shifts because accuracy of positional alignment of the sheet and the image structurally is inferior to other formats. Further, in a gravure printing machine used for mass printing, a round-shaped white portion called a pinhole may occur due to contamination of foreign matter such as paper powder or machine oil, or due to unevenness of the sheet surface. For this reason, it is necessary to inspect the print products of these printing apparatuses for defects that may occur.

In addition to the printing apparatus, there are inspections that are necessary depending on the apparatus used for production, such as a foreign matter contamination inspection in a case where processing is performed by a post-processing apparatus, for example, a bag making apparatus, and an additional/missing page inspection in a case where a bookbinding apparatus is used. Since the orderer does not have knowledge of the printing operations of the printing company or the printing apparatus, it is difficult to designate quality inspection items which depend on the apparatus.

Furthermore, each apparatus may have a unique characteristic, for example, a characteristic such as a color shift being likely to occur in a specific color. Since these apparatus-unique characteristics are information known only to the printing company that owns the apparatus, the orderer cannot consciously include inspection and quality evaluation criteria in the quality requirement.

As a method of determining inspection contents according to a production apparatus including a printing apparatus and a post-processing apparatus, Japanese Patent Laid-Open No. 2012-64831 discloses a method of performing only an inspection that, when a part of the production apparatus is changed, is affected by the part.

However, in the technique described in Japanese Patent Laid-Open No. 2012-64831, it is difficult to determine necessary inspections in consideration of both the required quality from the orderer and the characteristics of the apparatus used for production.

SUMMARY OF THE INVENTION

In addition to the inspection specified in the quality requirement, the present invention evaluates the quality of the product in consideration of the characteristics of the apparatus used for the production of the product.

The present invention has the following configurations. That is, according to an aspect of the present invention, a production control apparatus, comprising: one or more processors and one or more memories comprising one or more programs, wherein the one or more programs are configured to cause the one or more processors to: receive a print product production instruction; determine, in accordance with the production instruction, a production apparatus to be used for print product production; determine a first inspection item according to quality requirement data received together with the production instruction and a second inspection item according to the production apparatus respectively; and regarding the print product produced by using the production apparatus, inspect the determined first inspection item and the second inspection item respectively, and obtain an inspection result is provided.

According to the present invention, the quality evaluation of the product can be performed based on the quality requirements accepted from the orderer and the apparatus used to produce the ordered product. This makes it possible to carry out inspections in consideration of the characteristics of the apparatus used for production and to guarantee quality.

Further features of the present invention will become apparent from the following description of exemplary embodiments with reference to the attached drawings.

BRIEF DESCRIPTION OF THE DRAWINGS

FIG. 7 is a system flow for describing a processing flow of a whole order reception system.

FIG. 8 is a flowchart illustrating a flow of control of a controller unit 205 in creating a workflow.

FIG. 9A is a schematic view of various correspondence tables used for determination of an orderer-specified inspection FIG. 9B is a schematic view of various correspondence tables used for determination of an orderer-specified inspection FIG. 9C is a schematic view of various correspondence tables used for determination of an orderer-specified inspection FIG. 9D is a schematic view of various correspondence tables used for determination of an orderer-specified inspection FIG. 10 is a flowchart illustrating a flow of control of the controller unit 205 in creating a quality report FIG. 11A is a view illustrating an example of a Web page for placing orders to a printing company FIG. 11B is a view illustrating an example of a Web page for placing orders to a printing company FIG. 11C is a view illustrating an example of a Web page for placing orders to a printing company FIG. 12A is a view illustrating an example of quality requirement data FIG. 13A is a view illustrating an example of quality report data FIG. 13B is a view illustrating an example of quality report data FIG. 13C is a view illustrating an example of quality report data

DESCRIPTION OF THE EMBODIMENTS

Figure 1:
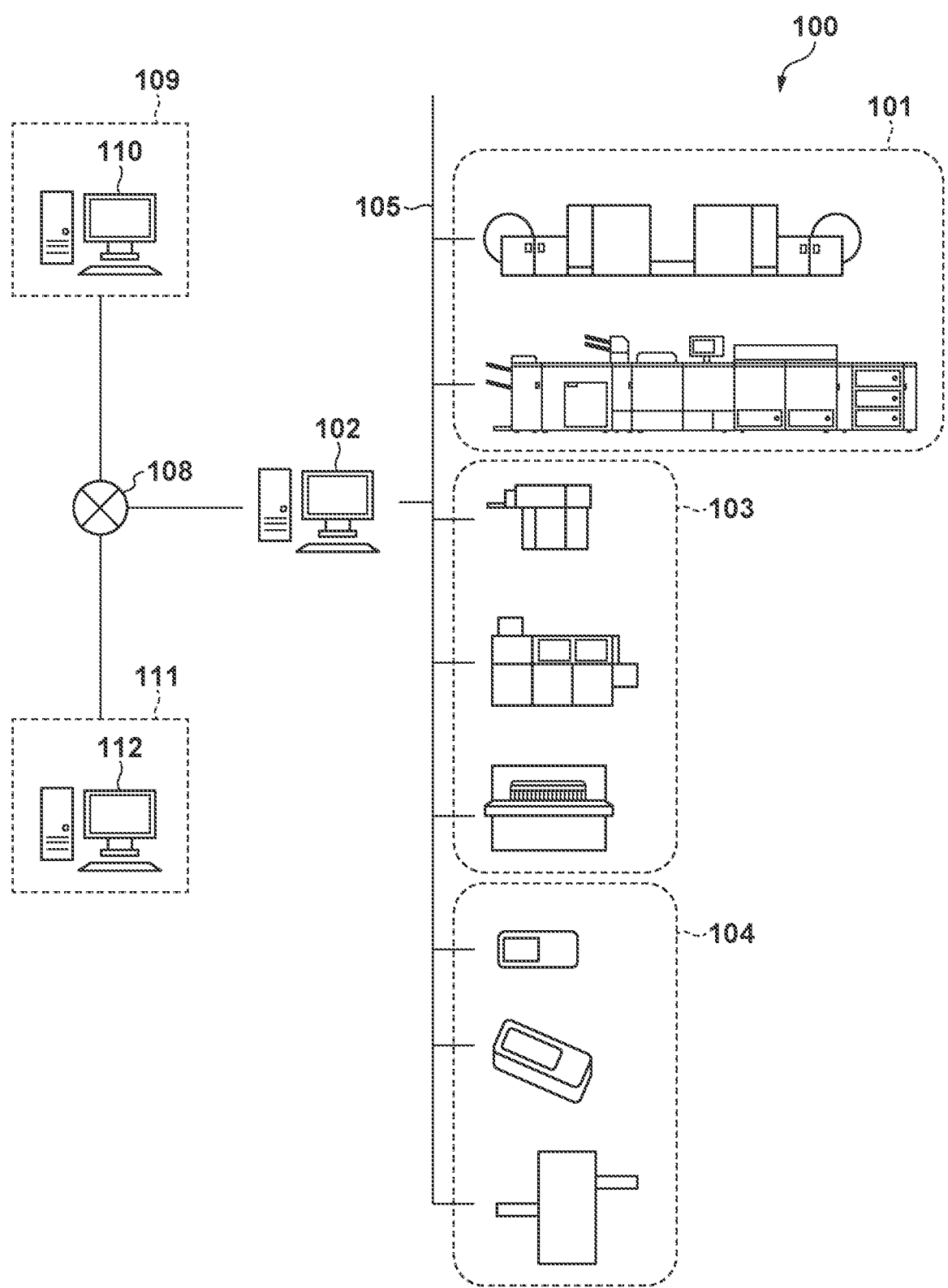
FIG. 1 is a block diagram illustrating a whole print processing system.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

System Configuration

FIG. 1 is a block diagram illustrating a system according to the present embodiment. The system is roughly divided into an orderer system 109, a printing company system 100, and a parent company system 111 of a printing company, which are interconnected by the Internet 108. The orderer system 109 includes at least one information processing apparatus 110. Similarly, the parent company system 111 includes at least one or more information processing apparatuses 112. The information processing apparatus 112 functions as an order reception server 112. Note, the whole system of FIG. 1 is referred to as an information processing system or a workflow system. However, the printing company system 100 managed by workflow software described later may be referred to as a workflow system. The various apparatuses included in the printing company system 100 are apparatuses used for the production of print products, and may also be referred to as production apparatuses.

Hereinafter, the internal configuration of the printing company system 100 is described in detail. As illustrated in FIG. 1, a plurality of apparatuses are interconnected by a network 105. These apparatuses include an information processing apparatus 102, various image forming apparatuses 101, various post-processing apparatuses 103, and various inspection apparatuses 104. The image forming apparatus 101 includes a plurality of image forming apparatuses of different printing methods. This makes it possible for the printing company to produce the products requested by the orderer in an optimal manner by using apparatuses having different printing mechanisms. The printing methods include a method in which a document is unnecessary, such as an electrophotographic method and an inkjet method, for example. In addition, a method in which an original is created once and printed may be included. The post-processing apparatuses 103 include, for example, a varnish coater, an adhesive binding machine, a trimming apparatus, and the like. The inspection apparatuses 104 include, for example, a bar code inspection machine, a colorimeter, a fluoroscopic image inspection apparatus, a print inspection apparatus, and the like.

Each apparatus is controlled under the workflow software operating on the information processing apparatus 102, processes job data received from the orderer system 109, and produces a product. The job data inputted from the orderer system 109 includes image data, a job ticket, and quality requirement data. A job ticket is input data such as a JDF format or a PDF format, for example. The quality requirement data is, for example, PRX (Print Request eXchange) format data. Data of the PRX format may be simply referred to as PRX. The information processing apparatus 102 in the printing company system 100 has a function of receiving a notification of a processing result of each apparatus described above, converting the inspection data received from the inspection apparatus 104 into quality report data, and also transmitting the quality report data to the order reception server 112. The quality report data format is, for example, PQX (Print Quality eXchange) format data.

Note, the workflow refers to, for example, a series of processes for creating a job for an apparatus or a person in charge of each process from upstream to downstream of the manufacturing process in order to manufacture a print product which is a product, and causing each job to be executed. Each job is executed by each apparatus or person in charge according to the manufacturing process to obtain the final product.

Hardware of the Image Forming Apparatus

Figure 2:
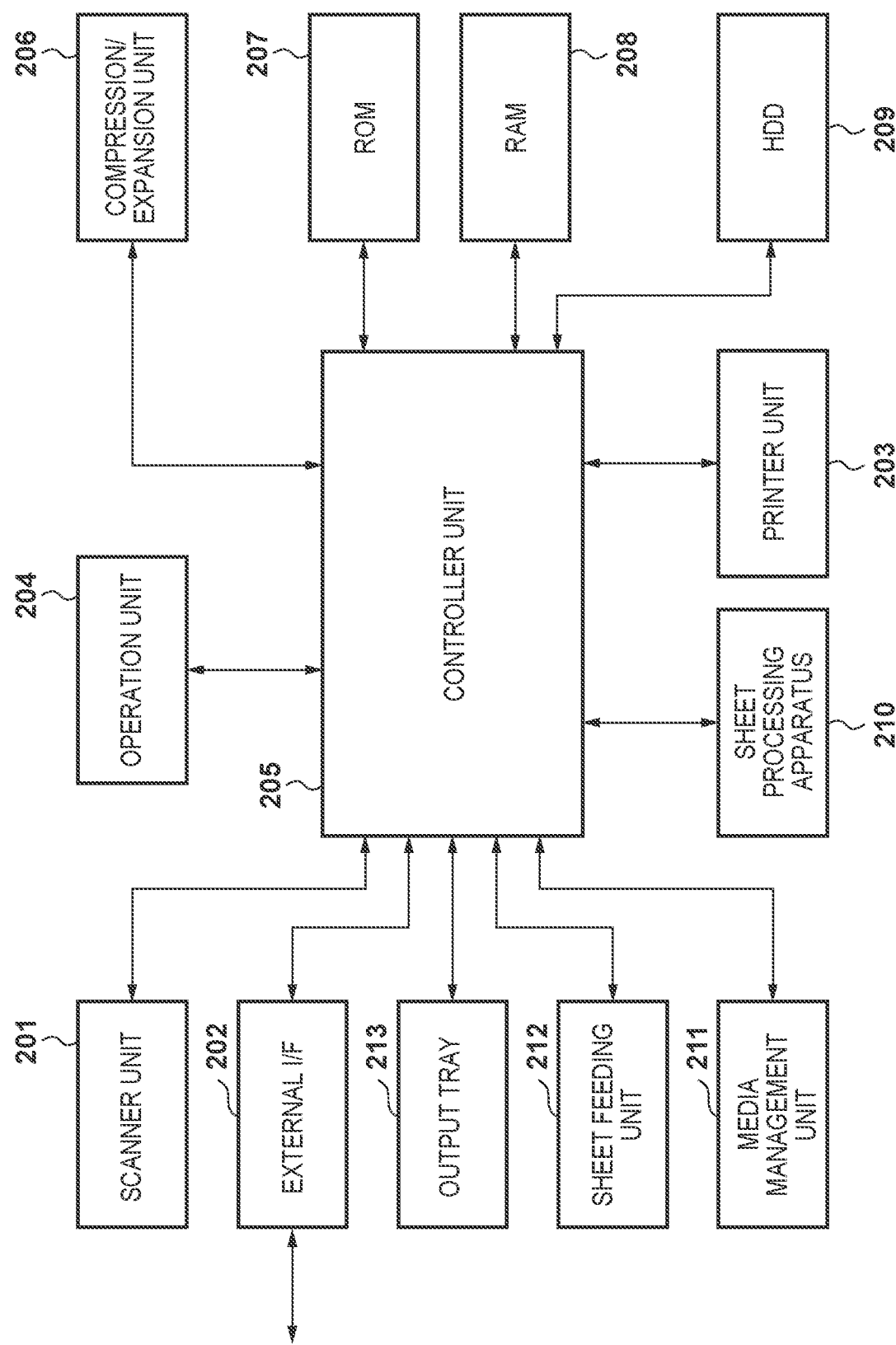
FIG. 2 is a hardware configuration view of an image forming apparatus

FIG. 2 is a view describing a hardware configuration of the image forming apparatus 101. The image forming apparatus 101 has a reading function for reading an image on a sheet and a print function for printing an image on the sheet. Also, the image forming apparatus 101 has a post-processing function for binding a plurality of sheets on which an image is printed, aligning a plurality of sheets, and dividing a discharge destination of the plurality of sheets into a plurality of trays. Note, a sheet includes a sheet such as plain paper or cardboard, a film sheet, and the like. The image forming apparatus 101 illustrated in the same figure is configured such that apparatuses having a plurality of different roles are connected to each other, and complicated sheet processing is possible.

The image forming apparatus 101 is an apparatus for conveying developed image data to a medium stored in a sheet feeding unit 212 and forming an image on the medium by using toner. The image forming apparatus 101 is provided with a scanner unit 201 and an operation unit 204. The operation unit 204 provides various interfaces when an operator performs various settings, operations, and the like of the image forming apparatus 101. The image forming apparatus 101 according to the present embodiment is configured so as to be mountable with various accompanying apparatuses. In the present embodiment, a sheet processing apparatus 210 is illustrated as an example of an accompanying apparatus.

The sheet processing apparatus 210 is an apparatus for obtaining a product obtained by performing various processes on a medium on which an image has been formed by the printer unit 203. An output tray 213 forms a tray unit for discharging and stacking the output products processed by the sheet processing apparatus 210. A hard disk 209 (hereinafter, also referred to as HDD) is a non-volatile memory that stores data of a plurality of jobs to be processed, various kinds of management information, and the like.

The job data received from the scanner unit 201 is printed by the printer unit 203 through the HDD 209. The printer unit 203 via the HDD 209 prints job data received from an external apparatus via an external I/F unit 202 corresponding to one example of a communication unit. The external I/F unit 202 transmits and receives image data and the like between a facsimile, a network connection device, and an external dedicated apparatus.

The operation unit 204 corresponds to a user interface unit, and includes a display unit here.

A controller unit 205 (referred to as a control unit or a CPU) collectively controls processing, operations, and the like of various units included in the image forming apparatus 101. Various control programs required in the present embodiment including a program for executing various processes and the like of the flowchart described later are stored in a ROM 207.

The ROM 207 also stores a display control program for displaying various UI screens on a display unit of the operation unit 204 including a user interface screen (hereinafter, referred to as a UI screen).

The controller unit 205 causes the present image forming apparatus 101 to execute various operations described in the present embodiment by reading and executing a program in the ROM 207. A program or the like for interpreting code data forming print data such as PDF (page description language and image data) and executing an operation for developing the data into raster image data (bit map image data) is also stored in the ROM 207. The print data may be received from an external apparatus (not shown), the information processing apparatus 102, for example, via the external I/F unit 202, for example. A program or the like for interpreting and processing a print job received from an external apparatus (not shown) via an external I/F unit 202 is also stored in the ROM 207. These are mainly processed by software. Details of various programs stored in the ROM 207 will be described later.

The HDD (hard disk) 209 is a large capacity storage apparatus that stores image data compressed by a compression/decompression unit 206. The HDD 209 is configured to be able to hold a plurality of data such as print data of a job to be processed. The controller unit 205 controls data of a job to be processed, which is inputted via various input units such as the scanner unit 201 or the external I/F unit 202, so that the data of the job can be printed by the printer unit 203 via the HDD 209. Further, the controller unit 205 also controls so that it can be transmitted to an external apparatus via the external I/F unit 202. In this way, various output processing of the data of the job to be processed stored in HDD 209 are controlled by the controller unit 205 so as to be executable. Further, a file system constructed in the HDD 209 is configured by the controller unit 205 reading and executing a program in the ROM 207 so as to be able to realize functions such as file sharing and transmission and reception to an external apparatus.

The compression/decompression unit 206 performs a compression/decompression operation of image data or the like stored in a RAM 208 and the HDD 209 by various compression methods such as JBIG or JPEG. According to the above-described configuration, the controller unit 205 as one example of a control unit that the present printing system provides also controls the operation of each sheet processing apparatus 210.

A media management unit 211 is a module for managing information on a media type.

Hardware of the Information Processing Apparatus

Figure 3:
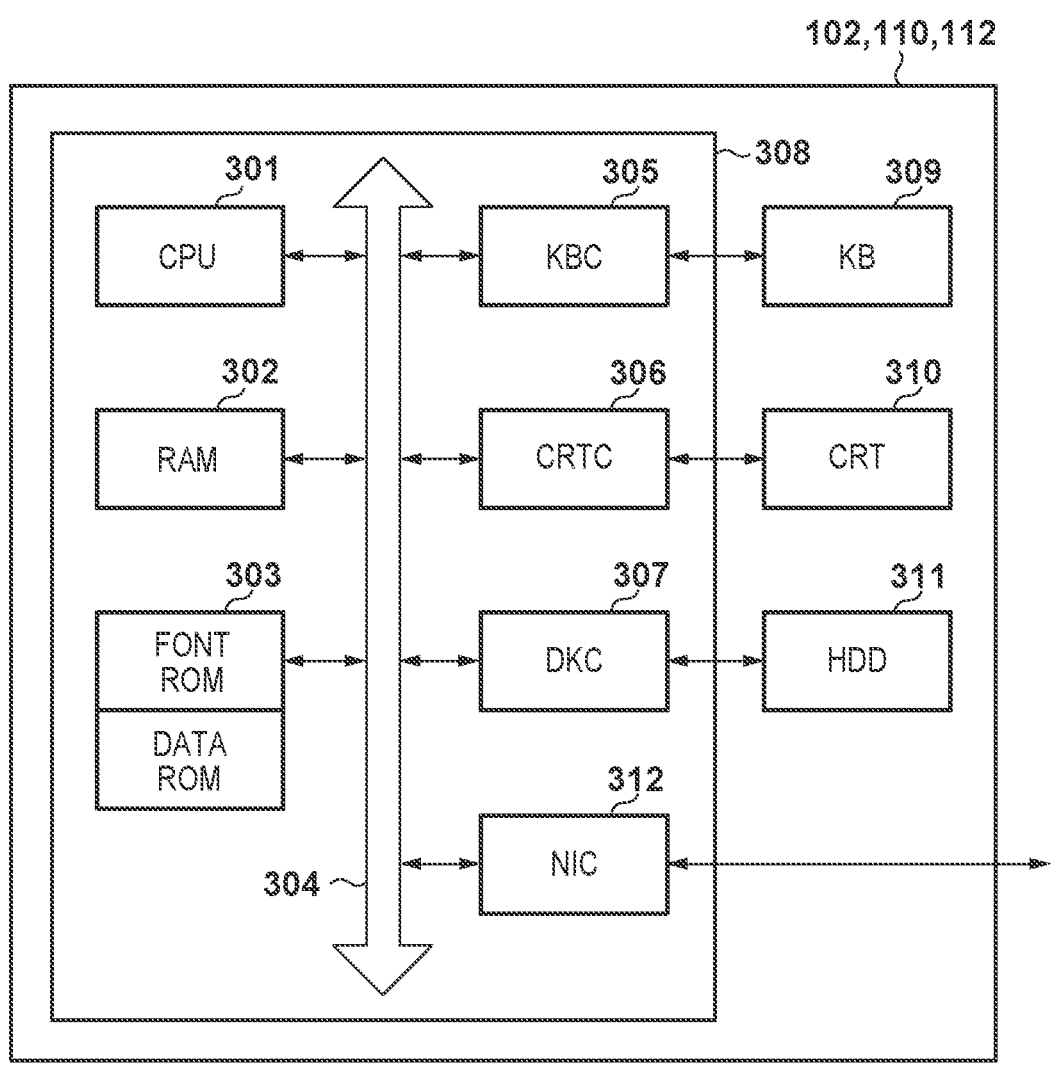
FIG. 3 is a hardware configuration view of an information processing apparatus

FIG. 3 is a block diagram illustrating a configuration of the information processing apparatuses 102, 110, and 112. In this figure, a CPU 301 executes a program of an OS or a general application stored in the program ROM of a ROM 303 or loaded into a RAM 302 from an HDD 311. The CPU 301 may be referred to as a control unit 301. The ROM 303 also has a font ROM or a data ROM. The RAM 302 functions as the main memory, work area, and the like of the CPU 301. A keyboard controller (KBC) 305 controls input from a keyboard or a pointing device (not shown). A display controller CRTC 306 controls the display on a display unit CRT 310. A disk controller (DKC) 307 controls access to a boot program, various applications, the HDD 311, and the like for storing font data and the like. The network controller (NIC) 312 is connected to the network and executes communication control processing with other devices connected to the network. A bus 304 is connected to the CPU 301, the RAM 302, the ROM 303, various controllers, and the like, and conveys data signals and control signals.

Note, in the case of a portable terminal, a touch panel controller or the like may be included in the configuration instead of the keyboard controller (KBC) 305. Also, a large-capacity storage apparatus in place of the HDD 311 may be included. Further, the network controller (NIC) 312 has a different internal configuration in the case where the apparatus that comprises has a wired LAN, a wireless LAN respectively, or both. However, the differences due to these internal configurations are hidden inside the network controller (NIC) 312, and configuration is such that it is possible to control the system as equivalent to the other modules illustrated in the same figure.

Software of the Image Forming Apparatus

Figure 4:
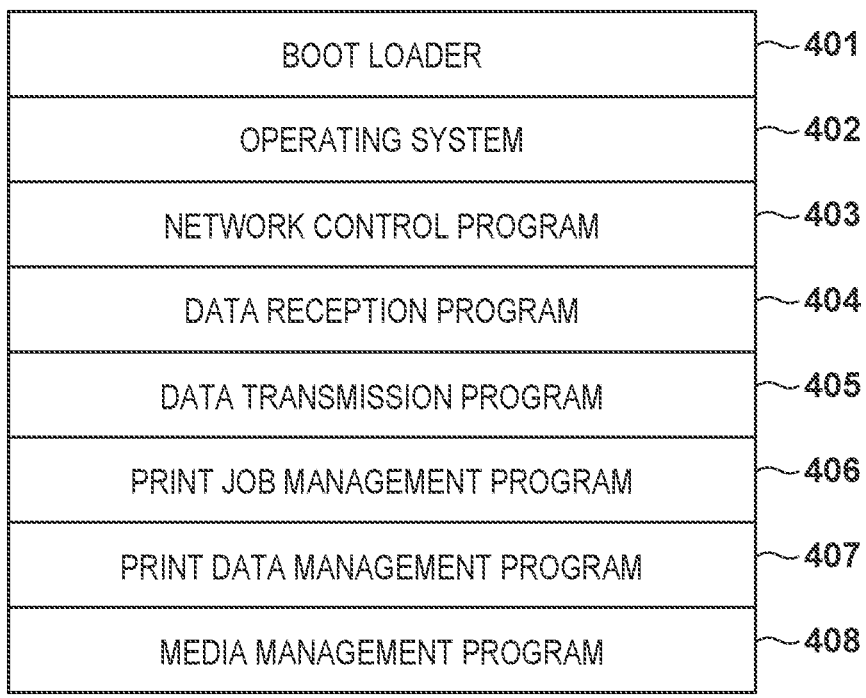
FIG. 4 is a software configuration diagram of an image forming apparatus

FIG. 4 is a view for describing a program of the image forming apparatus 101. These programs are stored in the ROM 207, and read and executed by the controller unit 205 of the image forming apparatus 101.

A boot loader 401 is a program executed immediately after the image forming apparatus 101 is powered on. This program includes programs for executing various startup sequences required for starting the system.

An operating system 402 is a program intended to provide an execution environment for various programs that realize the functions of the image forming apparatus 101. This mainly provides functions such as resource management of the memory of the image forming apparatus 101, that is, the ROM 207, the RAM 208, the HDD 209, and the like, and basic input/output control of other units shown in FIG. 2.

A network control program 403 is a program executed when transmitting and receiving data to and from devices connected via a network. This program is used for receiving a file to be printed, transmitting data from an external apparatus, and executing various processing of transmitting and receiving commands. The network control program also includes a driver program for controlling the external I/F unit 202.

A data reception program 404 is a program for accepting various instructions and information from the information processing apparatus 102. The print data is included among the information and instructions to be received by the program.

The data transmission program 405 is a program for transmitting information to the information processing apparatus 102. Among the information to be transmitted by the program, data for notifying the execution result of the print processing is included.

The print job management program 406 is a program for executing a print function executed by the controller unit 205 in response to an instruction from an external I/F unit 202 when the print job data is received by the image forming apparatus 101 via an external I/F unit 202. In this print function, the controller unit 205 sequentially instructs the operations of each device illustrated in FIG. 2 in an appropriate order based on the processing order and processing conditions described in this program. As a result, the printing process is eventually controlled to be executed. Each device includes the sheet processing apparatus 210, the printer unit 203, the HDD 209, the compression/decompression unit 206, the RAM 208, and the like. Processing for analyzing print data received through the external I/F unit 202, processing for determining whether or not incorrect settings are included as a result of the analysis processing, and processing of a program for changing settings and the like for eliminating incorrect settings are also included.

A print data management program 407 executes processing for developing print data executed by the controller unit 205 and a print function in a case where print target image data is received by the image forming apparatus 101 via the external I/F unit 202. The controller unit 205 sequentially instructs the operations of each device illustrated in FIG. 2 in an appropriate order based on the processing order and processing conditions described in this program. As a result, the PDL print process is eventually controlled to be executed. Each device includes the sheet processing apparatus 210, the printer unit 203, the HDD 209, the compression/decompression unit 206, the RAM 208, and the like. In addition, the print data management program according to the present embodiment is configured so as to operate together with the print job management program 406 as various specifications at the time of executing the print processing.

A media management program 408 is a program for executing a management function related to a sheet that can be used by the image forming apparatus 101. Sheet-related information managed by this program is stored in the HDD 209.

Software of the Information Processing Apparatus in the Printing Company System

Figure 5:
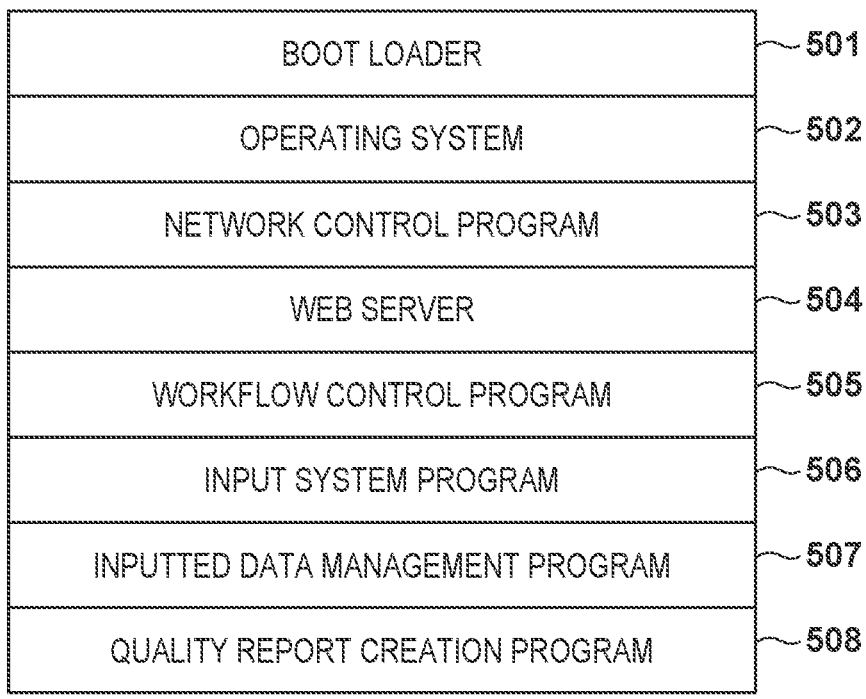
FIG. 5 is a software configuration diagram of an information processing apparatus of a printing company system

FIG. 5 is a view illustrating a configuration of a program included in the information processing apparatus 102 in the printing company system 100. The information processing apparatus 102 sets a workflow in accordance with a production instruction of a print product, and distributes each process to a corresponding apparatus or operator to execute the processes in a timely manner. Also, the quality evaluation is collected by inspecting the print product, which is the product. Therefore, the information processing apparatus 102 may be referred to as a production control apparatus.

A boot loader 501 is a program executed immediately after the information processing apparatus 102 is powered on. This program includes programs for executing various startup sequences required for starting the system.

An operating system 502 is a program intended to provide an execution environment for various programs that realize the functions of the information processing apparatus 102. This provides functions such as resource control of the memory of the information processing apparatus, that is, the ROM 303 or the RAM 302, the HDD 311, and the like.

A network control program 503 is a program executed when transmitting and receiving data to and from devices connected via a network. In other words, it is used when the print job data is transmitted to the image forming apparatus 101 and the print processing is instructed. It is also used when instructing the post-processing apparatus 103 to apply decoration processing or perform post-processing on the product after printing. It is also used to transmit the created quality report to the order reception server 112 in order to receive the inspection data from the inspection apparatus 104.

A web server 504 is a server program for allowing external devices connected via a network to utilize a web service. It is considered that the services provided by the web server 504 may vary. However, in the present embodiment, an example is given of a case where the web server 504 is provided as a means for inputting order target data from the orderer system 109 to the printing company system 100. Also, an example is given of a case where the web server 504 is provided as a means for obtaining a quality report for confirming whether or not the quality requirement that the orderer set in relation to the printing company at a time of input was achieved.

A workflow control program 505 is a program for centrally managing processing, control, job execution, and the like between devices connected via the network 105 inside the printing company system 100 and is the core of the printing company system 100. When manufacturing a product by using a plurality of processes, that is, a plurality of apparatuses, the execution order of the products, the execution control of the jobs, and the like are performed. The workflow control program 505 also executes control such as selection of an apparatus to be used, switching, and recovery production. Also, the workflow control program 505 also executes processing for issuing various instructions to an operator using the printing company system 100.

An input system program 506 is software mainly responsible for the role of holding and managing data in which a request for production from the orderer system 109 within the printing company system 100 was received. Also, the input system program 506 cooperating with the web server 504 is used to electronically execute, between the orderer system 109 and the printing company system 100, a series of processes for various functions, such as transmitting data, issuing invoices, for example, which are required for an order reception related business. Although specifications for communication between the orderer system 109 and the printing company system 100 are optional, a system that supports PrintTalk as a standard specification is widely known.

An inputted data management program 507 is a program for managing the input data accepted by the input system program 506. The inputted data management program 507 in the present embodiment manages the inputted data depending on an identifier and the version information of the quality requirement included in the inputted data. The inputted data management program has an inputted data search function which searches for and responds to the inputted data (including quality requirement information) having a designated identifier whose version is the most recent.

A quality report creation program 508 is a program for creating a quality report indicating to the orderer system 109 whether the product satisfies the quality condition specified by the quality requirement. The quality report creation program 508 receives an instruction from the workflow control program 505 and creates a quality report. The quality report creation program 508 receives and accumulates inspection result data from the inspection apparatus 104, converts the inspection result data into quality report data at an appropriate timing, and transmits the quality report data to the order reception server 112. The quality report data created may be, for example, in PRX format.

Software of the Information Processing Apparatus in the Customer System

Figure 6:
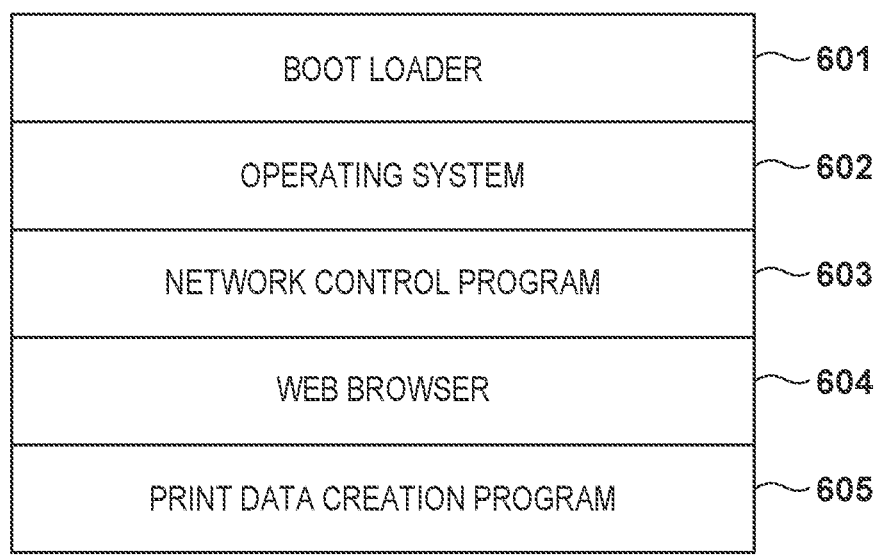
FIG. 6 is a software configuration diagram of an information processing apparatus of a customer system

FIG. 6 is a view illustrating a configuration of a program included in the information processing apparatus 110 in the orderer system 109.

A boot loader 601 is a program executed immediately after the information processing apparatus 110 is powered on. This program includes programs for executing various startup sequences required for starting the system.

An operating system 602 is a program intended to provide an execution environment for various programs that realize the functions of the information processing apparatus 110. This provides functions such as resource control of the memory of the information processing apparatus, that is, the ROM 303 or the RAM 302, the HDD 311, and the like.

A network control program 603 is a program executed when transmitting and receiving data to and from apparatuses connected via a network. That is, it is used when executing the transmission and reception of data between the printing company system 100 via the Internet 108. It is also used at a time of rendering display processing and data transmission/reception processing using a web browser described later.

A web browser 604 is a client program for utilizing a web service that an external system connected via a network provides. Various services that the web browser 604 uses can be considered. In the present embodiment, it is used to perform a data input request, which is an order target, to the printing company system 100. The data input request can also be referred to as a production instruction for instructing production of a print product, and the production instruction includes print settings and document data. The production instruction may further include quality requirements. Also, it is used to obtain a quality report for confirming whether or not the quality requirement that the orderer set in relation to the printing company at a time of input was achieved. Also, it may also be used to deliver a quality requirement (PRX for example) to the printing company system 100.

A print data creation program 605 is a program for creating data to be printed when production is requested from the orderer system 109 to the printing company system 100. A PDF (Portable Data Format), PS (PostScript), and the like are widely used as print data, and various applications to create these data exist.

Print Product Creation and Inspection Sequence

FIG. 7 is a system flow diagram for when the orderer system 109, the printing company system 100, and the orderer, that is, the user who is the operator of these, use the functions provided by the system. A user 701 indicates a user of the information processing apparatus 110 in the orderer system 109.

Hereinafter, a flow of control for transmission/reception between the system of the user 701, the information processing apparatus 110 of the orderer, the order reception server 112, the information processing apparatus 102 of the printing company, the image forming apparatus 101, the post-processing apparatus 103, and the inspection apparatus 104 is described.

The user 701 in step S720 performs an ordering operation and transmits the order data to the order reception server 112. An ordering operation operates the web browser 604, and inputs necessary information to the web page transmitted from a web server unit 703 to perform an instruction to transmit the latest order data (can also be referred to as a production instruction). FIG. 11A to FIG. 11C illustrate examples of web pages. Although only the instruction to transmit the order data is described in the present view, a web page capable of complicated ordering is configured interactively and data is transmitted and received a plurality of times. Order data is transmitted to a result web server unit 703 of the order processing. This communication must be encrypted using standards such as TLS. FIG. 11A to FIG. 11C are described in detail later.

In step S721, the web server unit 703 performs reception processing of the order data transmitted from the web browser 604. The received data is stored in the storage unit, and received order processing is requested to an order reception system unit 704. Connection to the web browser 604 is maintained. The order reception system unit 704 may be realized by executing the input system program 506, for example.

In step S722, the order reception system unit 704 performs received order processing. The order reception system unit 704 analyzes the order reception data and determines whether or not the content of order received can be accepted. Determination of acceptability is performed by checking whether or not a designated delivery deadline can be realized by comparison with other received order conditions, whether or not there is a shortage of input orderer information, or the like. In a case where the order can be received, the order data is registered in a form managed by the order reception system unit, and the completion of the acceptance of order reception is notified to the web server unit 703 as a received order processing result. A received order acceptance completion notification includes the ID of the order data uniquely registered in the form as a order number. In a case where the order cannot be accepted, the web server unit 703 is notified that the order cannot be accepted as a result of the received order processing. A received order impossible notification includes an error ID, an error message, and the like for specifying the cause of the determination that the order cannot be accepted.

In step S723, the web server unit 703 generates an order result web page corresponding to the accepted received order processing result. In a case where the received order acceptance completion notification is accepted, a web page including an ID received order number of the form is generated. In a case where the received order impossible notification is accepted, a web page including a message indicating that the received order could not be accepted and information that can specify the cause is generated. When the web page is generated, it is transmitted to the web browser 604 as a response to the connection of the order instruction accepted in step S720. In step S724, the web browser 604 analyzes the received web page and displays it as an order result.

As described above, the flow of the processing of the system relating to placing and receiving an order is from step S720 to step S724.

In a case where an order could be received, the order reception system unit 704 performs a production instruction to the a workflow control unit 705 in step S725. This processing is processing performed on the order registered in the form in step S722, passes the order reception data to the workflow control unit 705, and instructs the start of production. As methods of instructing production, there is a method for collectively instructing orders to be produced on a daily basis, a method for sequentially instructing orders for each order, and the like. The present invention is not limited to a method in which production instructions are made. In the description of the embodiment, it is assumed that the series of processes shown in step S725 to step S733 are performed for each order to be produced. Note, the workflow control unit 705 may be implemented by the CPU 301 executing the workflow control program 505.

In step S726, the workflow control unit 705 performs workflow processing. In the workflow processing, order reception data is analyzed, a series of processes necessary for generating an ordered product is created, and execution instructions are given to the apparatus for executing each process. A method of creating a workflow from the order data is described with reference to FIG. 8 and FIG. 9A to FIG. 9D. In accordance with the generated workflow, an instruction is given to the apparatus used in each process to perform processing. The instruction may be performed by the workflow control unit 705 via a network or the like, may be performed by outputting a work instruction in which the production process is described and operating each apparatus of the operator in accordance with the work instruction, or the like.

Although either case may be applicable, the description of the present embodiment is described as directly giving instructions via a network.

In the processing shown in step S727 to step S732, the instruction from the workflow control unit 705 to the apparatus is combined with the completed execution of the instruction and the transmission of the result. Jobs corresponding to the production processes created in the workflow processing of step S726 are executed by the corresponding apparatuses in the order of the created generation process. Therefore, the order does not necessarily coincide with that illustrated in the figure. In addition, there may be cases where instructions are given to a plurality of image forming apparatuses, post-processing apparatuses, and inspection apparatuses. For convenience of description, it is assumed that the print processing, the post-processing processing, and the inspection processing are performed one by one in this order. In the workflow processing of step S726, a print instruction is given to the image forming apparatus 101 that performs print processing that is the first process, and the print setting created in accordance with the order data and the document data (print file) included in the order data are transmitted. An instruction for printing by transmission of a print file and processing according to an instruction may also be called a print job. Note, if the document data can be processed as it is by the image forming apparatus 101, the document data may be processed; however, if the document data cannot be processed as it is, the document data may be converted into printing data and transmitted.

In step S727, a print control unit 706 of the image forming apparatus 101 analyzes the print specifications and print files accepted from the workflow control unit 705 and performs print processing. When printing is completed, a print completion notification is performed to the workflow control unit 705. The print control unit 706 may be realized by executing programs such as the print job management program 406 and the media management program 408, for example, by the controller unit 205.

In step S728, the workflow control unit 705 issues an execution instruction to an apparatus that executes the following process. Here, a post-processing instruction is given as the post-processing apparatus 103. In step S729, the post-processing apparatus 103 analyzes the post-processing instruction accepted from the workflow control unit 705, and performs post-processing. The post-processing processing may be started by, for example, an operator placing a product printed by the printing apparatus 101 on a predetermined position of the post-processing apparatus 103 and instructing the post-processing apparatus 103 to execute a post-processing job transmitted thereto. Alternatively, in a case where the post-processing apparatus 103 and the image forming apparatus 101 are connected by a sheet conveyance system, manual operations by the operator are not required, and subsequent post-processing may be performed after printing. When the post-processing is completed, the post-processing apparatus 103 notifies the workflow control unit 705 of the completion of the post-processing.

In step S730, the workflow processing unit 705 issues an execution instruction to an apparatus that executes the following process. Here, an inspection instruction is given as the inspection apparatus 104. The inspection processing in the inspection apparatus 104 may be executed in the same manner as the post-processing. In step S731, the inspection apparatus 104 analyzes the inspection instruction accepted from the workflow control unit 705, and performs inspection processing. When the inspection is completed, an inspection result notification is made to the workflow control unit 705.

In step S732, the workflow control unit 705 creates a quality report using the accepted inspection result. After creating the quality report, the workflow control unit 705 issues a quality report registration instruction to the web server unit 703 and hands over the quality report.

In step S733, the web server unit 703 stores the accepted quality report data in association with the order number.

Workflow Creation Processing

FIG. 8 is a flowchart illustrating the flow of processing by the control unit 301 of the information processing apparatus 102 in the workflow creation of the workflow processing of step S726.

In step S801, the control unit 301 of the information processing apparatus 102 of the printing company determines the operation process from the order data accepted from the order reception system unit 704. In the description of this embodiment, the operation process is assumed to be determined by the type of product ordered. The correspondence between the type of the product and the operation process is stored in the HDD 311 in advance, and the workflow control unit 705 loads so that the RAM 302 can be read and accessed. FIG. 9A illustrates examples of correspondences between the types of products and the operation process. Note, in addition to the type of the product, in a case where a detailed setting, for example, an option for lamination of a cover of the photo book can be specified in step S720, the operation process is associated with two of types of products and two types of options. After the description of FIG. 8, details of FIG. 9A are described. If the operation process is determined, the processing advances to step S802.

In step S802, the control unit 301 of the information processing apparatus 102 of the printing company determines an apparatus for performing each process of the determined operation process. It is assumed that the correspondence between the operation process and the execution apparatus is also determined in advance in the same manner as the correspondence between the type of the product and the operation process. FIG. 9B illustrates examples of the correspondences between the processes and the execution apparatuses. In the description of the present embodiment, it is assumed that the apparatus for executing each process is determined by the process, the type of product, and the number of copies. In addition, it is also conceivable that the delivery deadline, the specification at the time of ordering, the number of pages of the product, the sheet size, and the like are associated with each other. If the apparatus for performing the process is determined, the processing advances to step S803.

In step S803, the control unit 301 of the information processing apparatus 102 of the printing company determines an inspection (referred to as a mandatory apparatus inspection) associated with the apparatus to be used. It is known that a tendency toward defects caused by the type of apparatus that carries out the process and the characteristics of the individual is possible. Although the user 701 as the orderer does not know or need to be aware of the tendency of defects depending on the apparatus used for production, the printing company, which is the producer, must be aware of the defects and confirm that they will not occur. FIG. 9C illustrates examples of the apparatus and the corresponding mandatory apparatus inspection. The printing company registers these in advance and stores them in the HDD 311 so that the workflow control unit 705 can refer to them. By referring to the mandatory apparatus inspection correspondence table 920, the inspection corresponding to the execution apparatus used in each process determined in step S802 is obtained. Every inspection obtained is determined as a mandatory apparatus inspection and is stored in the RAM 302. If the mandatory apparatus inspection is determined, the processing advances to step S804.

In step S804, the control unit 301 of the information processing apparatus 102 of the printing company determines whether or not the order reception data analyzed in step S726 includes a quality requirement. As described above, the quality requirement is included in a case where the user 701 issues a specification regarding the quality requirement in the order operation of step S720. In a case where the quality requirement is included, the processing advances to step S805, and in a case where the quality requirement is not included, the processing advances to step S807.

In step S805, the control unit 301 of the information processing apparatus 102 of the printing company analyzes the quality requirement. The analysis may be performed in step S726. After the analysis, the processing advances to step S806.

In step S806, the control unit 301 of the information processing apparatus 102 of the printing company determines an orderer-specified inspection from a quality item required in the quality requirement. Since quality items are described in the quality requirements, the apparatus used for the inspection can be determined by using the inspection apparatus correspondence table 930 in FIG. 9D. If the orderer-specified inspection is determined, the processing advances to step S808.

In step S807, the control unit 301 of the information processing apparatus 102 of the printing company determines, as an execution inspection, the mandatory apparatus inspection determined in step S803. When the execution inspection is determined, the flowchart ends.

In step S807, the control unit 301 of the information processing apparatus 102 of the printing company determines, as an execution inspection, the mandatory apparatus inspection determined in step S803 and the orderer-specified inspection determined in step S806. Further, an inspection apparatus for executing the determined inspection is determined and stored in association with the execution inspection. The inspection instructions are issued based on this information. When the execution inspection is determined, the flowchart ends.

By determining the inspection results in accordance with the flowchart of this flow diagram, it is possible to determine the inspection and quality evaluation criteria based on the characteristics of the apparatus used, separate from the inspection specified by the orderer. By storing the inspection and the quality evaluation criteria in association with the apparatus in advance, it is possible to automatically determine the necessary inspection and the quality evaluation criteria from the order contents.

Tables Used in Workflow Processing

FIG. 9A to FIG. 9D are tables of various correspondences used in the workflow processing of step S726 and the determination of the orderer-specified inspection of step S806. These are each created by the operator of the printing company operating the operation unit and registering them in the workflow control unit 705. The created tables are stored in the HDD 311 and read into the RAM 302 as needed.

FIG. 9A is an operation process determination table 900 for associating the type of the ordered product referenced in the workflow processing of step S726 with an operation process. The value of the operation process column 902 is associated with and registered to the value of the product type column 901. In a case where the specification of an option or the like in an order affects the operation process, the presence or absence of an operation process is also registered.

FIG. 9B is a process execution apparatus determination table 910 which is referenced in order to determine an apparatus for executing the respective processes in the workflow processing of step S726. An example of a case in which the apparatus for performing the processes of a process column 915 is determined, is shown using a combination of the values of the process column 911 and number of copies column 913. The product type column 912 and the apparatus type column 914 are columns described for the sake of descriptive convenience and need not be associated. Process is for each process included in the operation process determined with reference to the operation process determination table 900. The type and number of copies of the product are specified by the orderer and are values included in the order data. It is assumed that a process not included in the process column 911 is performed by a person without using an apparatus. Also, an item marked with "-" means that it does not affect the determination of the apparatus.

FIG. 9C is the mandatory apparatus inspection determination table 920, which is referred to in step S803 of FIG. 8, for determining an inspection that must be performed in a case where the apparatus is used. In the mandatory apparatus inspection determination table 920, the value of an apparatus mandatory inspection column 923 is associated with the value of an apparatus name column 921. The mandatory apparatus inspection determination table 920 and the apparatus type column 922 are columns described for the sake of descriptive convenience and need not be associated. This is a table that is created based on the type and unique characteristics of the apparatus, and having knowledge of the printing site and experience of the operator who actually handles the apparatus are necessary.

For example, a hickey is an image defect unique to offset printing machines. In an offset printing machine, printing is performed by a mechanism of attaching ink to a plate and transferring the ink to a sheet, but the ink is not directly transferred from the plate to the sheet, but is transferred to the sheet via a rubber sheet called a blanket. In a case where paper powder adhering to the surface of the sheet adheres to the blanket at the time of transfer, or in a case where the surface of the sheet is peeled off due to the viscosity of the ink at the time of transfer, a white dot-like stain appears on the surface of the print product without transfer at only that part. Improvements in blankets and periodic cleaning can reduce the occurrence of hickeys, but they cannot be completely prevented by the mechanism of the offset printing machine.

In another example, a front-back shift occurs in which the front and back printing positions are shifted in an on-demand printing machine. On-demand printing machines convey sheets using rollers and align the sheets with the image to be printed by registration. The registration is generally performed by bringing the leading edge of the sheet into contact with an abutting member. Although there are various improved methods, the positional accuracy is inferior as compared with an offset printing machine in which a sheet is conveyed by sandwiching with claws, and the deviation of the printing position such as the deviation of the front and back faces cannot be completely prevented. The accuracy of the position depends on the type and unique characteristics of the on-demand printing machine.

Thus, the tendency of image defects to occur differs depending on the type and unique characteristics of the image forming apparatus, and a necessary inspection differs depending on which apparatus is used. The orderer is not knowledgeable about the printing site, and furthermore, information of the individual characteristics of the apparatus are not known. In the present embodiment, by referring to the mandatory apparatus inspection determination table 920 in step S803, the workflow control unit 705 automatically determines an inspection depending on the apparatus.

FIG. 9D is the inspection apparatus determination table 930 for determining an apparatus for executing an inspection in step S808. Values of an inspection column 931 are associated with values of an inspection apparatus name column 933 and a quality evaluation criteria column 934. The inspection apparatus type column 932 are columns described for the sake of descriptive convenience and need not be associated. The apparatus described in the inspection apparatus name column 933 is an inspection apparatus used when performing the inspection described in the inspection column 931. The quality evaluation criteria column 934 is a column for storing criteria for evaluating a result of an inspection in a case where a quality report is created. It is not absolutely necessary to set evaluation criteria for every inspection. In a case where the quality report is not created, the quality evaluation criteria column 934 is unnecessary. In the example illustrated in this figure, 10 is regarded as the evaluation with the best quality, and if a criteria of 8 is satisfied, the requirement as a product are satisfied. Products that do not meet the criteria of 8 are considered failures. Thus, the quality evaluation criteria column 934 may be defined for each required quality level (or evaluation rank).

It should be noted that in the case where the inspection contents can be registered as a preset in the inspection apparatus, or in the case where there is only one type of inspection or set thereof instructed to the inspection apparatus, the apparatus used for production and the inspection apparatus may be directly associated with each other without using the mandatory apparatus inspection determination table 920. In this case, the inspection apparatus determination table 930 is a table comprising the apparatus name column 921, the inspection apparatus name column 933, and the quality evaluation criteria column 934. Note, in FIG. 9D, foreign matter contamination among the inspection items is an event that may occur not only by the image forming apparatus but also by the post-processing apparatus, and an additional/missing page is an event that may occur with a perfect binding bookbinding apparatus, which is one of the post-processing apparatuses. As described above, the inspection target includes not only the image quality formed by the image forming apparatus but also the quality of post-processing. Of course, there may also be inspection items relating to post-processing, which are not described here.

Procedure of the Inspection Processing

FIG. 10 is a flowchart illustrating a flow of control of the controller unit 205 in creating a quality report of step S732.

In step S1001, the control unit 301 of the information processing apparatus 102 of the printing company analyzes the inspection result received from the inspection apparatus 104.

In step S1002, the control unit 301 of the information processing apparatus 102 of the printing company determines whether the inspection result accepted in step S1002 is the inspection result included in the mandatory apparatus inspection determined in step S803. In a case where it is an inspection result included in the mandatory apparatus inspection, the processing advances to step S1003, and if it is not included, the processing advances to step S1005.

In step S1003, the control unit 301 of the information processing apparatus 102 of the printing company evaluates the accepted result based on the quality evaluation criteria corresponding to the inspection. The quality evaluation criteria is obtained from the quality evaluation criteria column 934. For example, the evaluation rank corresponding to the inspection result for each inspection item may be used as the evaluation of the inspection item. When an inspection result is evaluated, the processing advances to step S1004. Note that in a case where the quality evaluation criteria is not specified, this step may be skipped.

In step S1004, the control unit 301 of the information processing apparatus 102 of the printing company creates additional elements in the quality report, and stores the accepted inspection results and evaluations. Additional elements are defined to allow the results of the mandatory apparatus inspection to be distinguished from the results of the orderer-specified inspection. When a result is stored in the quality report, the processing advances to step S1005.

In step S1005, the control unit 301 of the information processing apparatus 102 of the printing company determines whether the inspection result accepted in step S1002 is the inspection result included in the orderer-specified inspection determined in step S806. In a case where it is an inspection result included in the orderer-specified inspection, the processing advances to step S1006, and if it is not included, the processing advances to step S1008. It should be noted that a single inspection result (or inspection item) may be included in both the mandatory apparatus inspection and the orderer-specified inspection.

In step S1006, the control unit 301 of the information processing apparatus 102 of the printing company evaluates the accepted result based on the quality evaluation criteria corresponding to the inspection. The quality evaluation criteria is obtained from the analysis results of the quality requirements of step S805. When an inspection result is evaluated, the processing advances to step S1007.

In step S1007, the control unit 301 of the information processing apparatus 102 of the printing company creates standard elements in the quality report, and stores the accepted inspection results and evaluations. When a result is stored in the quality report, the processing advances to step S1008.

In step S1008, the control unit 301 of the information processing apparatus 102 of the printing company determines whether or not there is an inspection result from step S1001 for which the processing of step S1007 has not been performed among the inspection results accepted from the inspection apparatus. In a case where there is an unprocessed inspection result, the processing advances to step S1001 and the processing is performed. When there is no unprocessed inspection result, the flowchart ends.

According to this flowchart, it is possible to create a quality report so that the inspection result and evaluation designated by the printing company as the mandatory apparatus inspection can be distinguished from the inspection result and evaluation designated by the orderer. Even if both inspections are the same, each of them is evaluated according to the specified quality evaluation criteria, usage such as referring to the evaluation result based on a more strict criteria is possible.

Web Page Examples

FIG. 11A to FIG. 11C illustrate exemplary webpages for placing an order to a printing company in the information processing apparatus 110 of the orderer system 109.

The FIG. 11A illustrates an example of a product selection page 1100 among order pages transmitted by the information processing apparatus 112 of the printing company, which is the order reception server, in response to a request from the information processing apparatus 110 of the orderer. XML received by the web browser 604 is analyzed and displayed on the display. Web pages that require a plurality of related selection operations, such as print ordering, are usually interactive Web pages. In FIG. 11A, only the pages related to the present embodiment among the web pages that are transitioned by the interactive selection will be described.

A URL display portion 1101 is for displaying a URL of a web page. An the order page can be accessed by entering the corresponding URL.

A web browser tab portion 1102 is a button for being able to switch between a plurality of web pages displayed in a single window. The Web browser tab portion 1102 displays the name of the Web page being displayed.

From a business card selection button 1103 to a film package selection button 1106 are buttons for selecting a product to be ordered. The product displayed on each button can be selected, and a screen for finer order specification will be transitioned to when a button is selected.

FIG. 11B is a flyer detail ordering screen 1110 which is displayed on the operation unit by the web browser 604 in a case where a flyer selection button 1104 is selected on the product selection page 1100. On this screen, detailed settings can be made regarding the order of flyers.

A sheet size selection menu 1111 is a menu for selecting the sheet size of the flyers to be ordered. A list of sheet sizes can be displayed by the selection and a sheet size can be selected. The selection of the sheet size is mandatory. In a case where the mandatory selection item is not selected, a next button (not shown) cannot be selected.

A sheet thickness selection menu 1112 is a menu for selecting the sheet thickness of the flyers to be ordered. A list of sheet thicknesses can be displayed by the selection and a sheet thickness can be selected. The selection of the sheet thickness is mandatory.

A sheet type selection menu 1113 is a menu for selecting the sheet type of the flyers to be ordered. A list of sheet types can be displayed by the selection and a sheet type can be selected. The selection of the sheet type is mandatory.

An order count menu 1114 is a menu for designating the number of flyers to be ordered. In the case of a single output product such as a leaflet, orders are often accepted in units of 50 or 100 copies. In the case of a product comprising a plurality of pages such as a photo book, it is often possible to designate it in units of 1. In a case where the specification is accepted in units of 1, a sheet type selection menu 1114 is a field in which any number can be entered. The selection of the number of orders is mandatory.

An option designation menu 1115 is an additional designation to be made for the flyer to be ordered. In many cases, items such as post-processing processing such as folding processing and decoration processing such as lamination can be selected. In the example of the figure, two folds are designated. Selection of option designation menu 1115 is not mandatory. In a case where it is not selected, no additional designation is made. It is also possible to arrange a plurality of menus so that a plurality of designations can be made, or to select whether to execute or not execute by a radio button for each process.

FIG. 11C is a file upload screen 1120 which is a screen for uploading document data and quality requirements among the order pages.

A document file selection button 1121 is a button for selecting a document file to be uploaded. When the document file selection button 1121 is selected, a file selection dialog included in the web browser is displayed, and a file in the HDD 311 or a file stored in an external server connected via the network can be selected. When a file is selected, the address of the selected file is displayed in the left area. The selection of the document file is a mandatory item. In a case where the document file is not selected, the upload button 1123 cannot be selected.

Figure 12B:
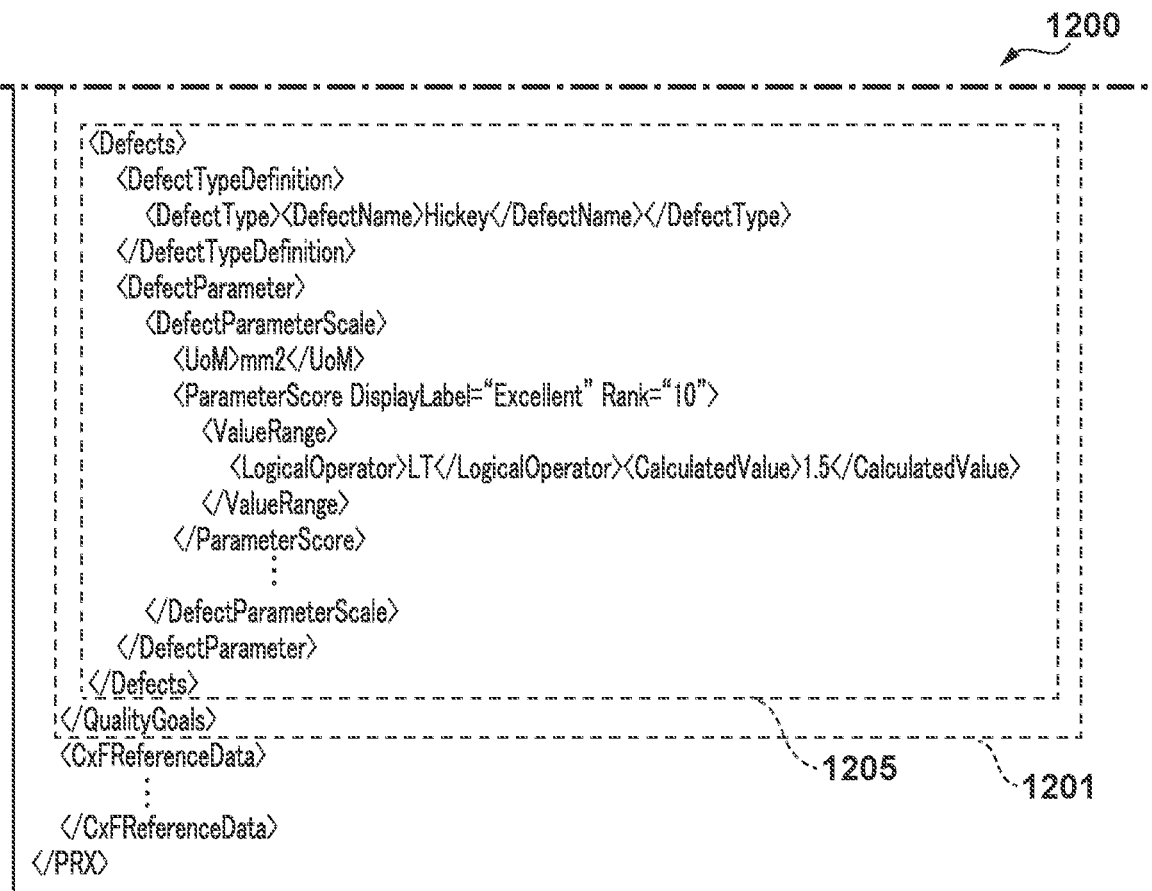
FIG. 12B is a view illustrating an example of quality requirement data

A quality requirement file selection button 1122 is a button for selecting a quality requirement file to be uploaded. Similar to the document file selection button 1121, a file can be selected in the file selection dialog, and the selected file is displayed. The quality requirement file is an optional item. It is not always necessary to set it. An example of a quality requirement file is illustrated in FIG. 12A to FIG. 12B. FIG. 12A to FIG. 12B illustrate a quality requirement file split into two.

An upload button 1123 is a button for performing an instruction to upload a file selected in the document file selection and the quality requirement file selection. It is initially unselectable and can be selected only when the document file is selected by selecting the document file. When the upload button 1123 is selected, the file selected in the document file selection and the quality requirement file selection is transmitted to the order reception server 112. After uploading the file, a transition is made to an orderer information input page (not shown).

A back button 1124 is a button for selecting to abort the upload of a file. When the back button 1124 is selected, a transition is made to the flyer detail ordering screen 1110, which is a page before transitioning to the file upload screen 1120. At this time, the file selection state of the document file selection and the quality requirement file selection is discarded.

Examples of Quality Requirement Data and Quality Report Data

FIG. 12A to FIG. 12B illustrate examples of data to be transmitted and received in the present embodiment. Only those characteristic of the present invention are described.

FIG. 12A to FIG. 12B are examples of a quality requirement file (also called quality requirement data or quality requirement information) 1200 selected and transmitted on the file upload screen 1120. In the description of the present embodiment, the PRX format is used as the quality requirement file.

A required quality definition portion 1201 defines the quality required for the product. Designation can be performed for various quality items in the required quality definition unit. Here, a case in which the orderer designates the color quality and a hickey as the defect is shown.

A color quality information definition portion 1202 includes information defining the color quality of the product. The color quality information definition portion 1202 further is configured from a color quality evaluation definition portion 1203 for storing information regarding evaluation of color quality, and a color quality measurement definition portion 1204 for storing information on a measurement.

The color quality evaluation definition portion 1203 defines information regarding criteria for evaluating a measured color quality. In the example of this figure, it is described when the color difference of the color measurement value is 0.4 or less, it is evaluated as rank 10. By defining a plurality of ParameterScores, a plurality of ranks and determination criteria can be defined.

The color quality measurement definition portion 1204 defines a position to be measured and color information to be referenced. In this figure, it is described that a color measurement of the position (334.0, 423.0) defined as positionCol1 is performed, and the color difference is calculated by referring to the color information of CxF001. A plurality of color quality measurement definition portions 1204 can be specified.

A defect definition portion 1205 is a portion for making definitions regarding an inspection and evaluation of defects a product. In the example of this figure, it is described that if a defect called a hickey is not detected, or if it is 1.5 mm2 or less, it is evaluated as rank 10. A plurality of ranks can be specified in the same manner as in the color quality evaluation definition portion 1203.

Examples of Quality Report Data

FIG. 13A to FIG. 13C are examples of the quality report data generated in step S732. In the description of the present embodiment, the PRX format is used as quality report data. Note that FIG. 13A to FIG. 13C illustrate a single quality report data 1210 divided into three parts.

A quality evaluation reporting portion 1211 is a portion for storing a result of evaluation of quality. The result of evaluation of the measurement result based on the criteria defined by the required quality definition portion 1201 or the criteria defined by the quality evaluation criteria 934 is stored.

A color quality evaluation reporting portion 1212 is a portion for storing a result of evaluation of color quality. Color measurement is performed at the position specified by the color quality measurement definition portion 1204, and the color difference with a reference color specified by the same color quality measurement definition portion 1204 is also calculated. Which of the ranks defined by the color quality evaluation definition portion 1203 corresponds to the obtained color difference is determined and stored in the color quality evaluation reporting portion 1212. In the illustrated example, since the color difference of all the colorimetric positions is 0.4 or less defined by the color quality evaluation definition portion 1203, the rank is determined to be 10.

A first defect evaluation reporting portion 1213 is a portion for storing a result of defect evaluation. The first defect evaluation reporting portion 1213 describes the result of evaluation of the hickey among the results. The first defect evaluation reporting portion 1213 includes a standard element result 1214 and an additional element result 1215. The standard element result 1214 is added in step S1007, and is the result of evaluating a defect using the quality evaluation criteria described in the defect definition portion 1205. The added element result 1215 is added in step S1004, and is the result of evaluating a result of using the quality evaluation criteria obtained from the quality evaluation criteria column 934. Since a Tag element whose Name attribute is Appended is defined in the additional element result 1215 and true is stored in the value of the Value attribute, it can be distinguished from the standard element result 1214. A hickey inspection is evaluated on both criteria because they are included in both the mandatory apparatus inspection and the orderer-specified inspection. In the example of the defect definition portion 1205, if the size of the hickey is 1.5 mm2 or less, rank 10 is defined, and in the example of the quality evaluation criteria column 934, rank 10 is defined as 1.0 mm2 or less, and the rank 8 is defined as 2.0 mm2 or less. In this way, in a case where the two quality evaluation criteria are different, the evaluation results of the standard element result 1214 and the additional element result 1215 are different.

A second defect evaluation reporting portion 1216 describes the result of evaluation of a ghost. A ghost inspection is not described in the defect definition portion 1205, and is an inspection item included only in the mandatory apparatus inspection. Therefore, the entire second defect evaluation reporting portion 1216 is an additional element, and a Tag element whose Name attribute is Appended is defined.

A measurement result storage portion 1217 is a portion for storing a measurement value obtained by an inspection. The measurement value of the designated measurement location or the location where the defect is detected is stored.

A colorimetry result storage portion 1218 stores colorimetry data of one location of the measurement results. The position of the print sheet at the inspection position designated by the color quality measurement definition portion 1204 and colorimetric data are stored.

A detected defect storage portion 1219 stores defect data of one location of the measurement results. The type, position, and size of the detected defect are stored.

As described above, an inspection result according to the quality requirement specified by the orderer and an inspection result of the mandatory apparatus inspection set by the printing company separate from the former are distinguishably included in the quality report data. Therefore, the web browser 604 that has received the quality report data can display the quality report for each inspection item according to the tag. For example, if there is an inspection report section including a Tag element whose Name attribute is Appended and whose Value attribute value is true, it is displayed as an inspection result of the mandatory apparatus inspection. On the other hand, if there is an inspection report section that does not include the tag, it is displayed as an inspection result corresponding to the quality requirement. Of course, the case of printing may be the same. Accordingly, the orderer can confirm that not only a standard of quality requirements specified by the orderer himself is satisfied, but also that the quality degradation or defect that the orderer cannot understand is maintained at a certain quality level.

According to the present embodiment, the inspections required in the generation of a print product are automatically determined from the apparatus in which they are used. Since the quality items depending on the apparatus are automatically determined and the quality report is created, the orderer may designate only the quality items depending on print data, such as tint, in the quality requirement.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-155755, filed Sep. 16, 2020 which is hereby incorporated by reference herein in its entirety.

What is claimed is:

1. A production control apparatus comprising:
one or more memories storing one or more programs; and
one or more processors configured to execute the one or more programs to:
receive a print product production instruction with or without quality requirement data associated with the print product production instruction;
determine, in a state where the print product production instruction has been received, a production apparatus, among a plurality of production apparatuses, to be used for producing a print product;
determine, in a state where the associated quality requirement data has been received with the print product production instruction, a first inspection item according to the quality requirement data and a second inspection item, among a plurality of second inspection items, according to the determined production apparatus; and
inspect the print product produced using the determined production apparatus according to the determined first inspection item and the determined second inspection item, and obtain an inspection result.

2. The production control apparatus according to claim 1, wherein:
the one or more processors are further configured to create quality report data based on the obtained inspection result, and
the quality report data includes the first inspection item and the second inspection item that are distinguishable from each other.

3. The production control apparatus according to claim 2, wherein the determined second inspection item is based on an inspection item associated in advance with each of the plurality of production apparatuses.

4. The production control apparatus according to claim 3, wherein the quality report data is created based on evaluation criteria for each of the plurality of second inspection items specified in advance.

5. The production control apparatus according to claim 4, wherein the quality report data is transmitted to an orderer of the print product.

6. The production control apparatus according to claim 1, wherein:
the determined production apparatus includes at least one image forming apparatus, and
the determined second inspection item relates to quality of an image formed by the at least one image forming apparatus.

7. The production control apparatus according to claim 1, wherein:
the determined production apparatus includes at least one post-processing apparatus, and
the determined second inspection item relates to quality of a print product processed by the at least one post-processing apparatus.

8. The production control apparatus according to claim 1, wherein:
the inspection uses at least one inspection apparatus, and
the at least one inspection apparatus is caused to inspect the produced print product according to the second inspection item.

9. The production control apparatus according to claim 1, wherein in a state where the quality requirement data has not been received with the print product production instruction, the produced print product is inspected according to the second inspection item only without the first inspection item.

10. A non-transitory computer readable medium storing a program executable by a computer to execute a method comprising:
receiving a print product production instruction with or without quality requirement data associated with the print product production instruction;
determining, in a state where the print product production instruction has been received, a production apparatus, among a plurality of production apparatuses, to be used for producing a print product;
determining, in a state where the associated quality requirement data has been received with the print product production instruction, a first inspection item according to the quality requirement data and a second inspection item, among a plurality of second inspection items, according to the determined production apparatus; and inspecting the print product produced using the production apparatus according to the determined first inspection item and the determined second inspection item, and obtaining an inspection result.

11. A method of producing of a print product using an information processing apparatus, the method comprising:
- receiving a print product production instruction with or without quality requirement data associated with the print product production instruction;
- determining, in a state where the print product production instruction has been received without the associated quality requirement data, a production apparatus, among a plurality of production apparatuses, to be used for producing a print product;
- determining, in a state where the associated quality requirement data has been received with the print product production instruction, a first inspection item according to the quality requirement data and a second inspection item, among a plurality of second inspection items, according to the determined production apparatus; and
- inspecting the print product produced using the production apparatus according to the determined first inspection item and the determined second inspection item, and obtaining an inspection result.

* * * * *